United States Patent
Zhou

(10) Patent No.: US 9,890,666 B2
(45) Date of Patent: Feb. 13, 2018

(54) HEAT EXCHANGER FOR A RANKINE CYCLE IN A VEHICLE

(71) Applicant: Ford Global Technologies, LLC, Dearborn, MI (US)

(72) Inventor: Shiguang Zhou, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 14/596,348

(22) Filed: Jan. 14, 2015

(65) Prior Publication Data

US 2016/0201519 A1     Jul. 14, 2016

(51) Int. Cl.
*F01K 23/10* (2006.01)
*F01K 23/06* (2006.01)

(52) U.S. Cl.
CPC .......... *F01K 23/101* (2013.01); *F01K 23/065* (2013.01); *Y02T 10/16* (2013.01); *Y02T 10/166* (2013.01)

(58) Field of Classification Search
CPC ........ F01K 23/065; F01K 23/101; F22B 9/12; F24H 9/0021; F28D 2021/0064; Y02T 10/16; Y02T 10/166
USPC ................ 165/139; 122/235.15, 31.1, 32, 33
See application file for complete search history.

(56) References Cited

U.S. PATENT DOCUMENTS

| | | | |
|---|---|---|---|
| 3,610,333 A * | 10/1971 | Fisher | F28F 9/0263 122/155.1 |
| 3,835,920 A | 9/1974 | Mondt | |
| 5,400,853 A | 3/1995 | Wolters | |
| 6,283,068 B1 * | 9/2001 | Kamikozuru | F17C 9/02 122/32 |
| 8,235,101 B2 | 8/2012 | Taras et al. | |
| 8,739,531 B2 * | 6/2014 | Teng | F01K 13/02 60/616 |
| 2003/0115877 A1 * | 6/2003 | Bara | F01K 23/065 60/620 |
| 2003/0145583 A1 * | 8/2003 | Tanaka | F01K 23/10 60/298 |
| 2004/0231330 A1 * | 11/2004 | Ibaraki | F01K 23/065 60/670 |
| 2005/0236145 A1 * | 10/2005 | Arai | F28D 1/0461 165/133 |
| 2008/0190591 A1 * | 8/2008 | Ayub | F25B 39/02 165/158 |
| 2009/0211253 A1 * | 8/2009 | Radcliff | F01K 23/065 60/670 |
| 2010/0012305 A1 | 1/2010 | Taras et al. | |
| 2012/0023946 A1 * | 2/2012 | Ernst | F01K 9/04 60/660 |
| 2013/0180471 A1 | 7/2013 | Truong et al. | |

* cited by examiner

*Primary Examiner* — Jason Shanske
*Assistant Examiner* — Jason T Newton
(74) *Attorney, Agent, or Firm* — Brooks Kushman P.C.; Greg Brown

(57) ABSTRACT

A vehicle includes a Rankine cycle containing a working fluid for waste heat recovery and has an evaporator. The evaporator has a heat exchanger tube positioned for generally horizontal flow of the working fluid therethrough. An inlet header is connected to a lower surface of an end region of the tube. An outlet header with a plurality of risers is positioned for generally vertical flow of the working fluid. The riser headers are connected to and spaced apart along an upper surface of the tube.

16 Claims, 4 Drawing Sheets

HEAT EXCHANGER FOR A RANKINE CYCLE IN A VEHICLE

TECHNICAL FIELD

Various embodiments relate to a heat exchanger for transferring heat to a working fluid in a Rankine cycle in a vehicle.

BACKGROUND

Vehicles, including hybrid vehicles, have internal combustion engines that produce exhaust gases at a high temperature. The vehicle also may have various systems with waste heat that require cooling, e.g. the engine coolant system with coolant fluid. A thermodynamic cycle such as a Rankine cycle may be used to recover waste heat within the vehicle during operation and provide power to the vehicle using a heat exchanger. Due to the mixed phase of the working fluid within the heat exchanger, prior, conventional heat exchangers may result in uneven or non-uniform heating, thermal fatigue and wear, and vapor lock in the cycle.

SUMMARY

In an embodiment, a heat exchanger is provided for a vehicle Rankine cycle having a working fluid. A heat exchanger tube is positioned for generally horizontal flow of a working fluid therethrough. An inlet header is connected to a lower surface of an end region of the tube. An outlet header with a plurality of risers is positioned for generally vertical flow of the working fluid. The riser headers are connected to and spaced apart along an upper surface of the tube.

In another embodiment, a vehicle is provided with an engine. The vehicle also has an expander, a condenser, and a pump in sequential fluid communication in a closed loop containing a evaporator configured to transfer heat between exhaust gas from the engine and a working fluid. The evaporator comprises a generally horizontal heat exchanger tube with a lower surface connected to an inlet header and a plurality of risers connected to and spaced apart along an upper surface of the tube.

In yet another embodiment, a once-through evaporator for a thermodynamic cycle is provided. The evaporator contains a working fluid in a vehicle for energy recovery from waste heat. The evaporator has an inlet manifold with at least one inlet header having an inlet riser section providing a vertical flow component for the working fluid containing a liquid phase. The evaporator has at least one heat exchanger tube having a first end region and a second end region. The heat exchanger tube has an outer surface defining a flow channel for the working fluid. The outer surface is adapted to contact a waste heat fluid. The inlet riser of an associated inlet header is connected to a bottom side of the tube adjacent to the first end region and is in fluid communication with the flow channel to provide the working fluid containing the liquid phase to the tube. The evaporator also has an outlet manifold with at least one outlet header having a collection tube and a series of outlet risers each providing a vertical flow component for a vapor phase of the working fluid. The outlet risers of the outlet header are connected to a top side of an associated heat exchanger tube and spaced apart along a length of the heat exchanger tube between the first and second end regions. One outlet riser is adjacent to the first end region and another outlet riser is adjacent to the second end region. The outlet risers are in fluid communication with the flow channel to provide the vapor phase of the working fluid to the collection tube and the outlet manifold.

Various examples of the present disclosure have associated, non-limiting advantages. For example, a heat exchanger for a Rankine or other thermodynamic cycle in a vehicle is provided. The heat exchanger has heat exchanger tubes or chambers for evaporation of a working fluid in the cycle using a waste heat fluid, such as an exhaust gas flowing around the heat exchanger tubes. As the working fluid is evaporated in the heat exchanger tubes, the vapor phase of the working fluid separates from the liquid phase and rises in vertical outlet risers of the outlet header. The liquid phase of the working fluid remains in the heat exchanger tubes and continues to be heated by the waste heat fluid. The remaining liquid in the heat exchanger tubes has a high thermal conductivity and high thermal transfer efficiency compared to the vapor phase. The design of the heat exchanger results in the liquid chambers and gas pipes having a generally even temperature distribution since phases of the working fluid separate as they evaporate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed. A fluid as described in the present disclosure may refer a substance in various states or phases including to vapor phase, liquid phase, mixed vapor/liquid phase, superheated gases, sub-cooled liquids, and the like.

A Rankine cycle may be used to convert thermal energy into mechanical or electrical power. Efforts have been made to collect thermal energy more effectively or from more than one system that rejects waste heat in the vehicle such as engine coolant, engine or transmission oil, exhaust gas recirculation (EGR) gases, exhaust gases, etc. The present disclosure provides for a Rankine cycle with a heat exchanger or an evaporator that provides for phase separation as the working fluid evaporates, thereby increasing the cycle efficiency and maintaining a generally even temperature distribution of the liquid and vapor phases of the working fluid within the evaporator.

Figure 1:
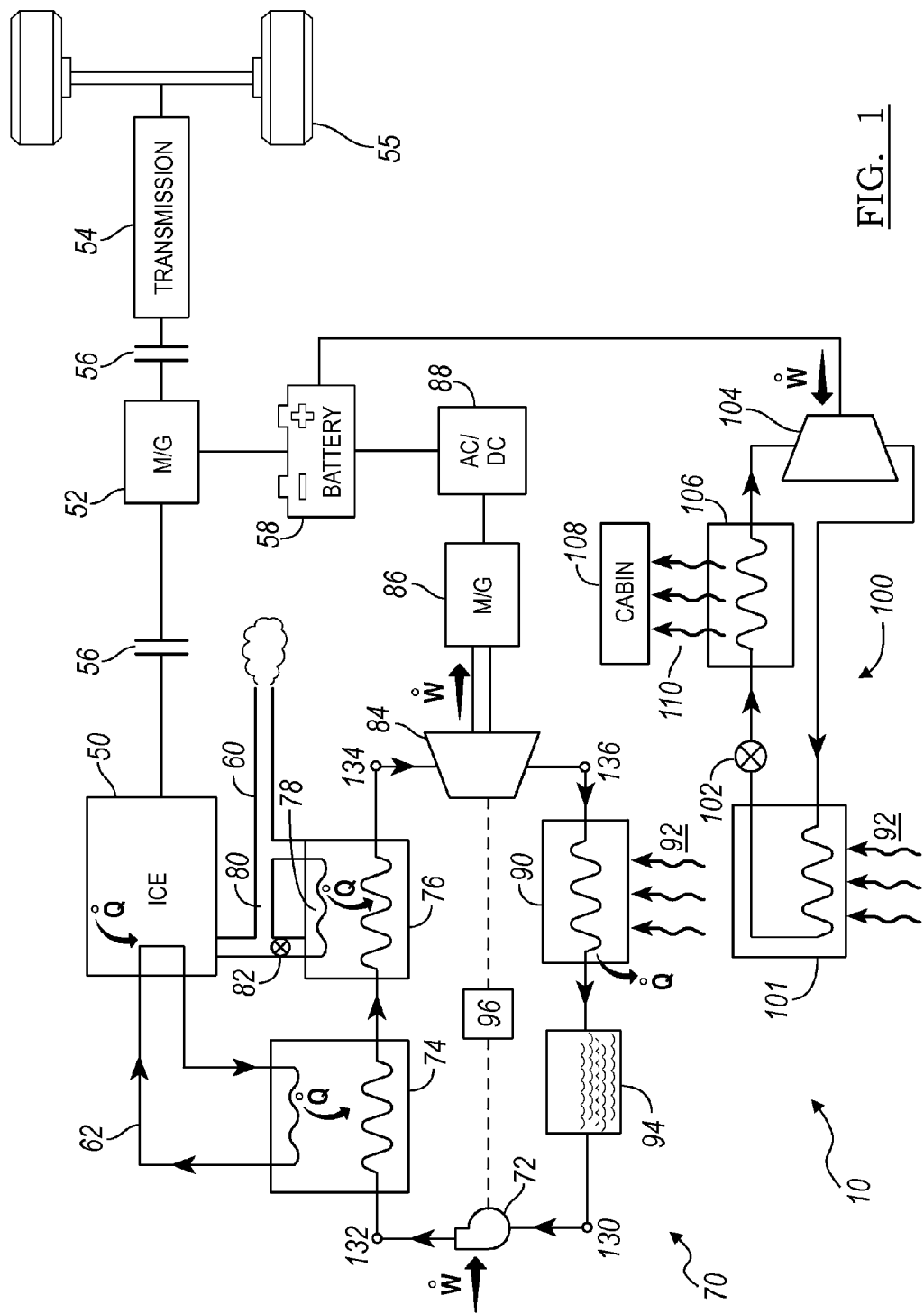
FIG. 1 illustrates a schematic of systems of a vehicle including a Rankine cycle according to an embodiment.

FIG. 1 illustrates a simplified schematic of various systems within a vehicle 10 according to an example. Fluids in various vehicle systems may be cooled via heat transfer to a working fluid within heat exchangers of a Rankine cycle, and the working fluid is in turn cooled in a condenser of the Rankine cycle using ambient air. The Rankine cycle allows for energy recovery by converting waste heat in the vehicle 10 to electrical power or mechanical power that would otherwise be transferred to ambient air as waste heat.

The vehicle may be a hybrid vehicle with multiple sources of torque available to the vehicle wheels. In other examples, the vehicle is a conventional vehicle with only an engine, or is an electric vehicle with only electric machine(s). In the example shown, the vehicle has an internal combustion engine 50 and an electric machine 52. The electric machine 52 may be a motor or a motor/generator. The engine 50 and the electric machine 52 are connected via a transmission 54 to one or more vehicle wheels 55. The transmission 54 may be a gearbox, a planetary gear system, or other transmission. Clutches 56 may be provided between the engine 50, the electric machine 52, and the transmission 54. The powertrain may be configured in various manners including as a parallel, a series, or a series-parallel hybrid vehicle.

The electric machine 52 receives electrical power to provide torque to the wheels 55 from a traction battery 58. The electric machine 52 may also be operated as a generator to provide electrical power to charge the battery 58, for example, during a braking operation.

The engine 50 may be an internal combustion engine such as a compression ignition engine or spark ignition engine. The engine 50 has an exhaust system 60 through which exhaust gases are vented from cylinders in the engine 50 to atmosphere. The exhaust system 60 may include a muffler for noise control. The emissions system 60 may also include an emissions system, such as a catalytic converter, particulate filter, and the like.

The engine 50 also has a coolant system 62. The coolant system contains an engine coolant fluid, which may include water, glycol, and/or another fluid, to remove heat from the engine 50 during operation. The engine 50 may be provided with an internal or external cooling jacket with passages to remove heat from various regions of the engine 50 using the recirculating engine coolant fluid. The coolant system 62 may include a pump and a reservoir (not shown).

The vehicle has a thermodynamic cycle 70. In one example, the cycle 70 is a Rankine cycle. In another example, the cycle 70 is a modified Rankine cycle, or another thermodynamic cycle that includes a working fluid transitioning through more than one phase during cycle operation. The Rankine cycle 70 contains a working fluid. In one example, the working fluid undergoes phase change and is a mixed phase fluid within the system that it exists as both a vapor phase and a liquid phase. The working fluid may be R-134a, R-245, or another organic or inorganic chemical refrigerant based on the desired operating parameters of the cycle.

The cycle 70 has a pump 72, compressor, or other device configured to increase the pressure of the working fluid. The pump 72 may be a centrifugal pump, a positive displacement pump, etc. The working fluid flows from the pump 72 to one or more heat exchangers. The heat exchangers may be preheaters, evaporators, superheaters, and the like configured to transfer heat to the working fluid.

The example shown has a first heat exchanger 74, which is configured as a preheater. A second heat exchanger 76 is provided, and may be configured as an evaporator. In other examples, greater or fewer heat exchangers may be provided downstream of the pump 72. For example, the cycle 70 may be provided only with heat exchanger 76, or may be provided with three or more heat exchangers to heat the working fluid. Additionally, the heat exchangers downstream of the pump 72 may be arranged or positioned in various manners relative to one another, for example, in parallel, in series as shown, or in a combination of series and parallel flows.

The heat exchangers 74, 76 are configured to transfer heat from an outside heat source to heat the working fluid within the cycle 70 and cause a phase change from liquid to vapor phase. In the example shown, the heat exchanger 74 is configured to transfer heat from the engine coolant fluid in coolant loop 62 to the working fluid in the cycle 70. The temperature of the engine coolant is therefore reduced before returning to the engine 50 to remove heat therefrom and heat exchanger 74 acts as a heat sink in the coolant system 62. The temperature of the working fluid of the cycle 70 is likewise increased within the heat exchanger 74.

In other examples, as discussed in greater detail below, the heat exchanger 74 is configured to transfer heat to the working fluid of the cycle 70 from another fluid in a vehicle system, including, but not limited to, an engine lubrication fluid, a transmission lubrication fluid, and a battery cooling fluid. In a further example, multiple preheating heat exchangers 74 are provided and are each in fluid communication with a separate vehicle system to receive heat therefrom. Valving, or another flow control mechanism may be provided to selectively direct and control flow to the multiple heat exchangers.

In another example, the heat exchanger 74 is positioned downstream of the heat exchanger 76 such that it is configured as a superheater, and transfers heat from a fluid from various vehicle systems, including, but not limited to, exhaust gas recirculation (EGR) flow. The heat exchanger 74 provides a heat sink for the EGR flow, and thereby provides waste heat to the working fluid in the cycle 70. The positioning of the heat exchanger 74 relative to heat exchanger 76 may be based on an average temperature or available heat in the waste heat fluids of the vehicle systems.

A second heat exchanger 76 is also provided in the cycle 70. The heat exchanger 76 is configured to transfer heat to the working fluid of the cycle from exhaust gases in the engine exhaust system 60 in one example. The engine exhaust system 60 may have a first flow path 78 through or in contact with the heat exchanger 76. The engine exhaust system 60 may also have a second, or bypass, flow path 80 to divert exhaust gas flow around the heat exchanger 76. A valve 82 may be provided to control the amount of exhaust gas flowing through the heat exchanger 76, which in turn provides a control over the amount of heat transferred to the working fluid, and the temperature and state of the working fluid at the exit of the heat exchanger 76 or upstream of the expander 84.

At least one of the heat exchangers 74, 76 is configured to transfer sufficient heat to the working fluid in the cycle 70 to evaporate the working fluid, as discussed further below. The evaporator receives the working fluid in a liquid phase or liquid-vapor mixed phase solution, and heats the working fluid to a vapor phase or superheated vapor phase. The disclosure generally describes using heat exchanger 76 as an evaporator using the engine exhaust 60; however, the evaporator is described in greater detail below with reference to FIGS. 3 and 4. Heat exchanger 74 in the cycle 70 may be provided as the evaporator.

The expander 84 may be a turbine, such as a centrifugal or axial flow turbine, or another similar device. The expander 84 is rotated or actuated by the working fluid to produce work as the working fluid expands. The expander 84 may be connected to a motor/generator 86 to rotate the motor/generator to generate electrical power, or to another mechanical linkage to provide additional mechanical power to the driveshaft and wheels 55. The expander 84 may be connected to the generator 86 by a shaft or another mechanical linkage. The generator 86 is connected to the battery 58 to provide electrical power to charge the battery 58. An inverter or AC-DC converter 88 may be provided between the generator 86 and the battery 58.

The working fluid leaves the expander 84 and flows to a heat exchanger 90, also referred to as a condenser 90 in the cycle 70. The condenser 90 may be positioned in a front region of the vehicle 10. The condenser 90 is configured to be in contact with an ambient air flow 92 such that heat is transferred from the working fluid to the ambient air flow 92 to remove heat from the working fluid and cool and/or condense the working fluid. The condenser 90 may be single stage or multiple stages, and the flow of the working fluid may be controllable through the various stages as required by the cycle 70 using valves or other mechanisms.

In some examples, the cycle 70 includes a fluid accumulator 94 or dryer. The accumulator 94 may be provided as a fluid or liquid reservoir for the working fluid in the cycle 70. The pump 72 draws fluid from the accumulator 94 to complete the cycle 70. As can be seen from FIG. 2, the cycle 70 is a closed loop cycle such that the working fluid does not mix with other fluids in the vehicle or with ambient air.

The cycle 70 may include a controller 96 that is configured to operate the cycle within predetermined parameters as described below. The controller 96 may be in communication with the pump 72, expander 84, and various valves and/or sensors in the cycle 70 and vehicle 10.

The controller 96 may be incorporated with or be in communication with an engine control unit (ECU), a transmission control unit (TCU), a vehicle system controller (VSC), or the like, and may also be in communication with various vehicle sensors. The control system for the vehicle 10 may include any number of controllers, and may be integrated into a single controller, or have various modules. Some or all of the controllers may be connected by a controller area network (CAN) or other system. The controller 96 and the vehicle control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle or the cycle 70.

The vehicle may also be provided with an air conditioning system 100 in one or more embodiments. The air conditioning system 100 may form a part of a heating, ventilation, and air conditioning (HVAC) system for the vehicle 10. The HVAC 100 system provides air at a controlled temperature to the vehicle or passenger cabin for cabin climate control by the vehicle occupants. The air conditioning system 100 has a first heat exchanger 101 or condenser in contact with the ambient air 92. The condenser 101 may be positioned in the front region of the vehicle 10. The condenser 101 is configured for heat transfer between ambient air and a refrigerant or other fluid in the system 100.

The air conditioning system 100 may also include an expansion device, valve, or throttle 102, and a compressor or pumping device 104. The system 100 has another heat exchanger 106 in contact with air flow 110 to be directed to the vehicle cabin 108, and the refrigerant in the system 100. Air flow 110, which is intended for cabin conditioning, flows over and is cooled by refrigerant in the heat exchanger 106, and then flows to the cabin 108 as required by the vehicle occupants.

Figure 2:
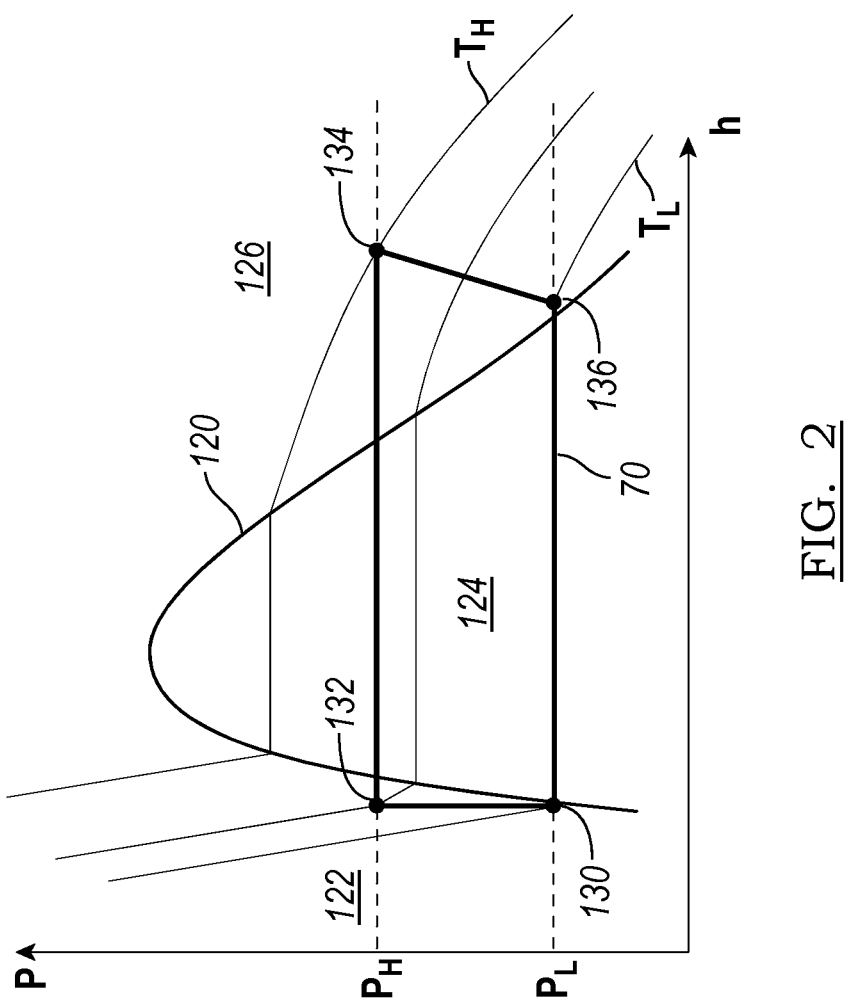
FIG. 2 illustrates a simplified pressure-enthalpy diagram for the Rankine cycle of FIG. 1.

FIG. 2 illustrates a pressure-enthalpy chart for the working fluid of the Rankine or thermodynamic cycle 70 as shown in FIG. 1. The chart has pressure (P) on the vertical axis and enthalpy (h) on the horizontal axis. Enthalpy may have units of energy per unit mass, e.g. kJ/kg.

The dome 120 provides a separation line between the various phases of the working fluid. The working fluid is a liquid or sub-cooled liquid in region 122 to the left of the dome 120. The working fluid is a vapor or superheated vapor in region 126 to the right of the dome 120. The working fluid is a mixed phase, e.g. a mixture of liquid and vapor phase, in region 124 underneath the dome 120. Along the left hand side of the dome 120, where region 122 and 124 meet, the working fluid is a saturated liquid. Along the right hand side of the dome 120, where region 124 and 126 meet, the working fluid is a saturated vapor.

The Rankine cycle 70 of FIG. 1 is illustrated on the chart according to an embodiment. The charted cycle 70 is simplified for the purposes of this disclosure, and any losses in the cycle 70 or system are not illustrated although they may be present in actual applications. Losses may include pumping losses, pipe losses, pressure and friction losses, heat loss through various components, and other irreversibilities in the system. The operation of the cycle 70 as shown in FIG. 2 in simplified to assume constant pressure, and adiabatic, reversible, and/or isentropic process steps as appropriate and as described below; however, one of ordinary skill in the art would recognize that the cycle 70 may vary from these assumptions in a real-world application. The cycle is charted as operating between a high pressure, $P_H$, and a low pressure, $P_L$. Constant temperature lines are shown on the chart as well, e.g. $T_H$ and $T_L$.

The cycle 70 begins at point 130 where the working fluid enters the pump 72. The working fluid is a liquid at 130, and may be sub-cooled to a temperature of 2-3 degrees Celsius or more below the saturation temperature at $P_L$. The working fluid leaves the pump 72 at point 132 at a higher pressure, $P_H$, and in a liquid phase. In the example shown, the pumping process from 130 to 132 is modeled as being isentropic, or adiabatic and reversible.

The working fluid enters one or more heat exchangers at 132, for example, heat exchangers 74, 76. The working fluid is heated within the heat exchangers 74, 76 using waste heat from fluids in one or more vehicle systems. In the example shown, the working fluid is heated using engine coolant and exhaust gas. The working fluid leaves the heat exchangers at point 134. The heating process from 132 to 134 is modeled as a constant pressure process. As can be seen from the Figure, the process from 132 to 134 occurs at $P_H$, and the temperature increases to $T_H$ at 134. The working fluid begins in a liquid phase at 132 and leaves the heat exchangers 74, 76 in a superheated vapor phase at 134. In the example shown, the working fluid enters heat exchanger 76 as a mixed liquid-vapor phase fluid, and leaves the heat exchanger 76 in the vapor phase.

The working fluid enters an expander 84, such as a turbine, at point 134 as a superheated vapor. The working fluid drives or rotates the expander as it expands to produce work. The working fluid exits the expander 84 at point 136 at a pressure, $P_L$. The working fluid may be a superheated vapor at 136, as shown. In other examples, the working fluid may be a saturated vapor or may be mixed phase and in region 124 after exiting the expander 84. In a further example, the working fluid is within a few degrees Celsius of the saturated vapor line on the right hand side of dome 120. In the example shown, the expansion process from 134 to 136 is modeled as isentropic, or adiabatic and reversible. The expander 84 causes a pressure drop and a corresponding temperature drop across the device as the working fluid expands.

The working fluid enters one or more heat exchangers at 136, for example, heat exchanger 90. The working fluid is cooled within the heat exchanger 90 using ambient air received through the frontal region of the vehicle. The working fluid leaves the heat exchanger 90 at point 130, and then flows to the pump 72. An accumulator may also be included in the cycle 70. The cooling process from 136 to 130 is modeled as a constant pressure process. As can be seen from the Figure, the process from 136 to 130 occurs at $P_L$. The temperature of the working fluid may decrease within the heat exchanger 90. The working fluid begins as a superheated vapor or vapor-liquid mixed phase at 136 and leaves the heat exchanger 90 as a liquid at 130.

In one example, the cycle 70 is configured to operate with a pressure ratio of $P_H$ to $P_L$ of approximately 3, or in a further example, with a pressure ratio of approximately 2.7. In other examples, the pressure ratio may be higher or lower. The cycle 70 may be adapted to operate in various ambient environments as required by the vehicle 10 and its surrounding environment. In one example, the cycle 70 is configured to operate across a range of possible ambient temperatures. The ambient temperature may provide a limit to the amount of cooling available for the working fluid in the heat exchanger 90. In one example, the cycle 70 may be operated between an ambient or environmental temperature of −25 degrees Celsius and 40 degrees Celsius. In other examples, the cycle 70 may operate at higher and/or lower ambient temperatures.

The power provided by the cycle 70 may be a function of the mass flow rate of the waste heat fluid, the temperature of the waste heat fluid, the temperature of the working fluid at point 134, and the mass flow rate of ambient air. For example, with exhaust gas providing the sole source of waste heat, the power provided by the cycle 70 is a function of the mass flow rate of exhaust gas through the heat exchanger 76, the temperature of the exhaust gas entering heat exchanger 76, the temperature of the working fluid at point 134, and the mass flow rate of ambient air. For systems with more than one waste heat source, the mass flow rates and temperatures of each source would also be included for the power provided by the cycle 70. In one example, the power out of the cycle 70 is on the order of 0.5-1.5 kW, and in a further example, is approximately 1 kW for a cycle with exhaust temperatures ranging from 500-800 degrees Celsius, and an exhaust gas mass flow rate ranging from 50-125 kg/hr.

The efficiency of the cycle 70 with respect to the vehicle 10 may be determined based on the electric power produced by the generator 86, and a rate of heat transfer available from the waste heat sources, e.g. engine exhaust, engine coolant, etc. The rate of heat transfer available is a function of the mass flow rate of the waste heat fluid through the associated cycle heat exchanger and the temperature difference of the waste heat fluid across the heat exchangers. In one example, the cycle efficiency was measured to be above 5% on average using exhaust gas heat only, and in a further example, the cycle efficiency was measured to be above 8% on average for a cycle using exhaust gas waste heat only.

Maintaining the state or phase of the working fluid at specific operation points within the cycle 70 may be critical for system operation and maintaining system efficiency. For example, one or both of the heat exchangers 74, 76 may need to be designed for use with a liquid phase, a mixed phase fluid, and a vapor phase fluid. The working fluid may need to be a liquid phase at point 130 in the cycle to prevent air lock within the pump 72. Additionally, it may be desirable to maintain the working fluid as a vapor between points 134 and 136 based on the expander 84 construction, as a mixed phase may reduce system efficiencies or cause wear on the device 84. Based on the ambient air temperature, and the speed of the vehicle, which controls the ambient air flow rate, the amount and/or rate of cooling that is available to the working fluid within the heat exchanger 90 may also be limited. Furthermore, the amount and/or rate of heat available to heat the working fluid may be limited at vehicle start up when the engine exhaust and/or engine coolant has not reached their operating temperatures.

The cycle 70 may be operated at various operating conditions, for example, based on a minimum ambient air operating temperature, $T_{L,min}$ and a maximum ambient air operating temperature, $T_{H,max}$. The working fluid is selected based the cycles and operating states of the various points in the cycle, and the constraints imposed by these operating states. Additionally, the cycle 70 may be controlled to operate within a desired temperature and pressure range by modifying the flow rate of exhaust gas or other waste heat source through the heat exchangers 74, 76, thereby controlling the amount of heat transferred to the working fluid and its temperature at point 134. The heat exchanger 90 may also be controlled by providing additional stages, or limiting stages for working fluid to flow through based on the ambient air temperature, flow rate, and humidity, thereby controlling the amount of cooling and the working fluid temperature at point 130. Additionally, the flow rate of the working fluid may be controlled by the pump 72, such that the working fluid has a longer or shorter residence time in each heat exchanger 74, 76, 90, thereby controlling the amount of heat transferred to or from the working fluid.

Figure 3:
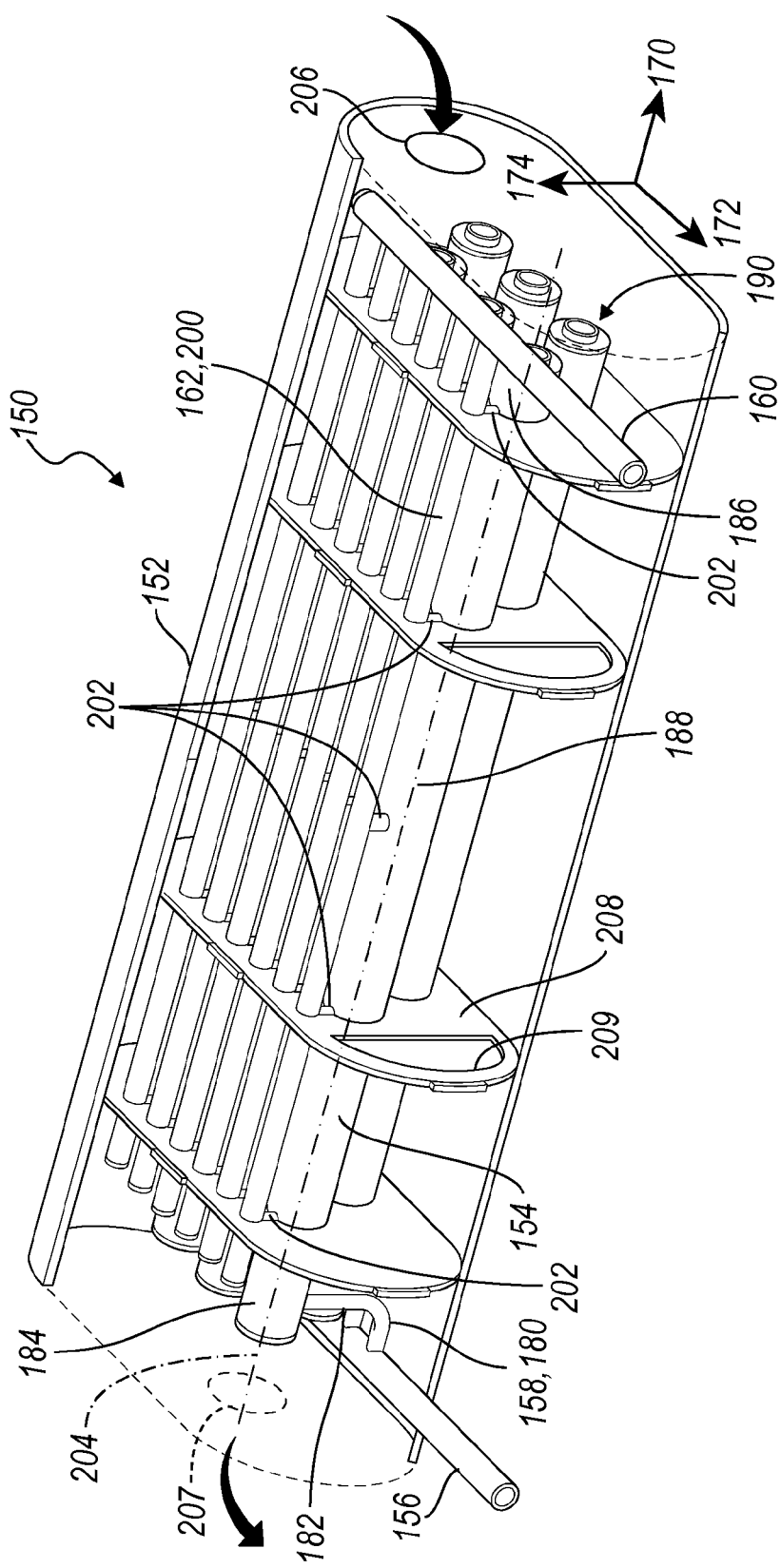
FIG. 3 illustrates a perspective view of a heat exchanger for the Rankine cycle of FIG. 1.

FIG. 3 illustrates a heat exchanger 150 for use with the Rankine cycle 70 or a similar mixed phase thermodynamic cycle for waste heat recovery in a vehicle. The heat exchanger 150 is configured as an evaporator for the cycle 70. The heat exchanger 150 may be used as heat exchanger 76 in the cycle 70 and is configured to transfer heat between exhaust gases and the working fluid in the cycle 70 to heat the working fluid. In other examples, the heat exchanger 150 may be used to transfer heat between another waste heat fluid stream and the working fluid, for example, an EGR gas flow.

The heat exchanger 150 has a housing 152 surrounding a series of heat exchanger tubes 154 or chambers. The heat exchanger 150 may have one heat exchanger tube 154, or may have two, three, five, ten, or any number of tubes 154 or chambers. An inlet manifold 156 provides a flow of working fluid in the thermodynamic cycle 70 to the heat exchanger 150. The inlet manifold 156 is connected to an inlet header 158. The inlet header 158 has a series of tubes each connected to and providing liquid phase working fluid to an associated heat exchanger tube 154. An outlet manifold 160 has an outlet header 162 with tubes connected to associated heat exchanger tubes 154. The outlet manifold 160 and outlet header tubes 162 receive the vapor phase working fluid from the heat exchanger tubes 154 such that the working fluid continues to flow through the thermodynamic cycle.

The heat exchanger 150 has a longitudinal axis 170, a transverse axis 172, and a vertical axis 174. The heat exchanger tubes 154 are illustrated having a longitudinal axis that is generally parallel with the longitudinal axis 170, e.g., the heat exchanger tubes 154 extend generally parallel with the longitudinal axis 170. The vertical axis 174 may be generally aligned with the gravitational force on the heat exchanger 150. The longitudinal axis 170 and transverse axis 172 may be generally perpendicular to the vertical axis 174 such that they both lie in a horizontal plane of the heat exchanger 150. As the heat exchanger 150 may be used in a vehicle 10 with a cycle 70 as described above, the axes 170, 172, 174 may deviate from true vertical and horizontal as the vehicle 10 moves over various grades. However, the vertical axis 174 retains at least a component of a vertical gravitational force as the vehicle travels over various grades.

The inlet manifold 156 is positioned in a thermodynamic cycle such as cycle 70 to be downstream of a pump or the like. The inlet manifold 156 receives working fluid in a liquid phase or mixed liquid vapor phase. In other examples, the working fluid may be a vapor phase, for example, when another heat exchanger is positioned between the pump and the heat exchanger 150 in the cycle. The working fluid containing a liquid phase flows through the inlet manifold tube 156. Although only one inlet manifold tube 156 is shown, the heat exchanger 150 may also have additional manifold tubes, valves controlling fluid flow, and the like in other examples. The inlet manifold 156 may extend in the transverse direction and be generally parallel with the transverse axis 172. In other examples, the manifold tube 156 may be positioned otherwise in the heat exchanger 150. The inlet manifold 156 may provide for generally horizontal flow of the working fluid therethrough.

The inlet manifold 156 has an inlet header 158 including one or more inlet header tubes or inlet risers 180 to direct the working fluid to the various heat exchanger tubes 154. The inlet header 158 may include one or more inlet risers 180 for each heat exchanger tube 154. The inlet risers 180 fluidly connect the inlet manifold 156 to the heat exchanger tubes 154. Each inlet riser 180 may contain a section 182 providing a vertical flow component for the working fluid. As shown in FIG. 3, the risers 180 have a first section connected to the manifold 156 and a generally vertical section 182 connected to the tube 154. The first section and section 182 may be perpendicular to one another or arranged at another angle relative to one another. In other examples, the risers 180 may have another shape, or may only have a straight section, such as section 182 connecting the manifold 156 to the tube 154. As the tubes 154 are arranged in an array, the various tubes 180 of the header 158 may vary from one another to connect the manifold 156 to the heat exchanger tubes 154.

The heat exchanger tubes 154 are provided in the heat exchanger 150 and provide the primary mechanism for heat transfer between the waste heat fluid and the working fluid in the heat exchanger 150. The heat exchanger tubes 154 may extend generally horizontally within the heat exchanger 150, and may be generally parallel with the longitudinal axis 170 as shown. In other examples, the tubes 154 may be otherwise positioned within the heat exchanger 150. The heat exchanger tubes 154 may be arranged in an array as shown, where they are spaced apart from one another to allow for waste heat fluid to flow therebetween. The spacing and positioning of the heat exchanger tubes 154 may also provide for control over the flow path of the waste heat fluid through the heat exchanger 150. For example, by offsetting adjacent rows of tubes 154, turbulent flow may be induced in the waste heat fluid, leading to increased heat transfer.

The heat exchanger tubes 154 are illustrated as being generally straight tubes. In other examples, the tubes may be curved or otherwise shaped. The tubes 154 have a first end region 184 and a second end region 186. An intermediate region 188 is positioned between the two end regions 184, 186. In one example, as shown, the inlet header 158 is connected to the first end region 184.

The heat exchanger tubes 154 may have a shell construction, as shown by arrow 190. The shell construction for the tubes 154 provides for flow of the waste heat fluid over an inner wall and an outer wall of the tube 154, thereby increasing the surface area of the tube 154 and increasing the heat transferred from the waste heat fluid to the working fluid. In another example, the tubes 154 are provided as standard tubes without a shell construction. In further examples, the tubes 154 may have multiple layers of a shell style construction providing additional surface area for heat transfer.

The outlet manifold 160 has an outlet header 162 including one or more outlet collection tubes 200 that receive the working fluid from the various heat exchanger tubes 154. Each collection tube 200 of the outlet header 162 may include one or more outlet risers 202. The outlet risers 202 and collection tube 200 fluidly connect the heat exchanger tubes 154 to the main outlet tube of the outlet manifold 160.

Each outlet riser 202 may contain a section providing a vertical flow component for the working fluid. As shown in FIG. 3, the risers 202 have a generally vertical section connected to the tube 154. The risers 202 provide an exit for a vapor phase of the working fluid at multiple locations from the heat exchanger tubes 154. In the example shown, a plurality of risers 202 are provided for each heat exchanger tube 154, with one riser 202 connected to the tube 154 at the first end region 184, another riser 202 connected to the tube 154 at the second end region 186, and additional risers 202 connected to the tube 154 across the intermediate region 188. The risers 202 may be connected to the tube 154 and spaced apart along a longitudinal axis 204 of the tube 154. The risers 202 may be equally spaced from one another, or there may be variable spacing between the risers 202. The risers 202 may have the same cross sectional area, or may have varying cross sectional areas to provide additional control over the flow of the working fluid. As the tubes 154 are arranged in an array, the various tubes of the header 162 including the risers 202 may vary from one another to connect the manifold 160 to the heat exchanger tubes 154.

The collection tubes 200 are each positioned above a respective heat exchanger tube 154 and may be generally parallel to the longitudinal axis 204. The collection tube 200 may generally extend the length of the heat exchanger tube 154, and fluidly connects the risers 202 with the outlet manifold 160 tube. In one example, the collection tube 200 and the risers 202 are positioned generally perpendicular to one another.

The primary tube of the outlet manifold 160 is positioned in a thermodynamic cycle to be upstream of an expander, or the like. The outlet manifold 160 provides working fluid in a vapor phase or superheated vapor phase. Although only one outlet manifold tube 160 is shown, the heat exchanger 150 may also have additional manifold tubes, valves controlling fluid flow, and the like in other examples. The outlet manifold 160 may extend in the transverse direction and be generally parallel with the transverse axis 172. In other examples, the manifold tube 160 may be positioned otherwise in the heat exchanger 150. The outlet manifold 160 may provide for generally horizontal flow of the working fluid therethrough. The outlet manifold 160 may be opposed to the inlet manifold 156 such that the heat exchanger tubes 154 are positioned between them. In other examples, the inlet and outlet manifolds 156, 160 may be on the same side of the heat exchanger 150 and adjacent to one another.

The heat exchanger tubes 154 may be supported by the housing 152, for example, at the ends of the housing. The housing is provided with an inlet port 206 and an outlet port 207 for the waste heat fluid. In the example shown, the inlet port 206 is provided on one end plate of the housing 152, and the outlet port 207 is provided on the other end plate of the housing 152. The inlet and outlet ports 206, 207 may be connected to an exhaust gas system for an engine, or another vehicle system providing waste heat for use in the Rankine or thermodynamic cycle. The heat exchanger 150 as shown is configured as a counterflow heat exchanger where the working fluid and the waste heat fluid travel in opposed directions. In other examples, the heat exchanger 150 may be configured as a parallel flow heat exchanger, a cross flow heat exchanger, or the like. The heat exchanger 150 may be a once-through heat exchanger where the working fluid only makes a single pass through the heat exchanger and does not cycle or recirculate within it.

The housing 152 may be provided with baffles 208. The baffles 208 may provide structural support for the heat exchanger tubes 154, the collection tubes 200, as well as the outer wall of the housing. The baffles 208 may additionally support or form a part of the risers 202. The baffles 208 may include various openings 209 to allow waste heat fluids to pass through. The spacing and positioning of the baffles 208 may be used to control the flow of the waste heat fluid through the heat exchanger 150. Additionally, the openings 209 in the baffles 208 may be positioned and sized to control the flow of the waste heat fluid through the heat exchanger 150.

The various tubes of the heat exchanger 150 are illustrated as having a circular cross section; however, other shapes are also contemplated for the tubes of the heat exchanger 150, and the various tubes may be the same shape and sizes, or may have different shapes or sizes from one another.

The heat exchanger 150 may be made from various materials and manufactured accordingly. In the example shown, the heat exchanger 150 is made from a metal, such as aluminum, and is welded or otherwise connected together. In other examples, the heat exchanger 150 may be made from other materials based on their thermal conductivities, melting temperatures, and other material properties such as corrosion or chemical resistance, etc. For example, if the waste heat fluid is an engine exhaust gas, the heat exchanger 150 is configured for operation in a high temperature, for example, with approximately 800 degree Celsius gases. The heat exchanger 150 may also need to be designed with pressure drops as a consideration, both for the working fluid and for the waste fluid. For example, when engine exhaust gas is used as the waste fluid, the heat exchanger 150 may be configured to provide a low pressure drop for the exhaust gas across the heat exchanger 150 to limit a back pressure on the engine.

Figure 4:
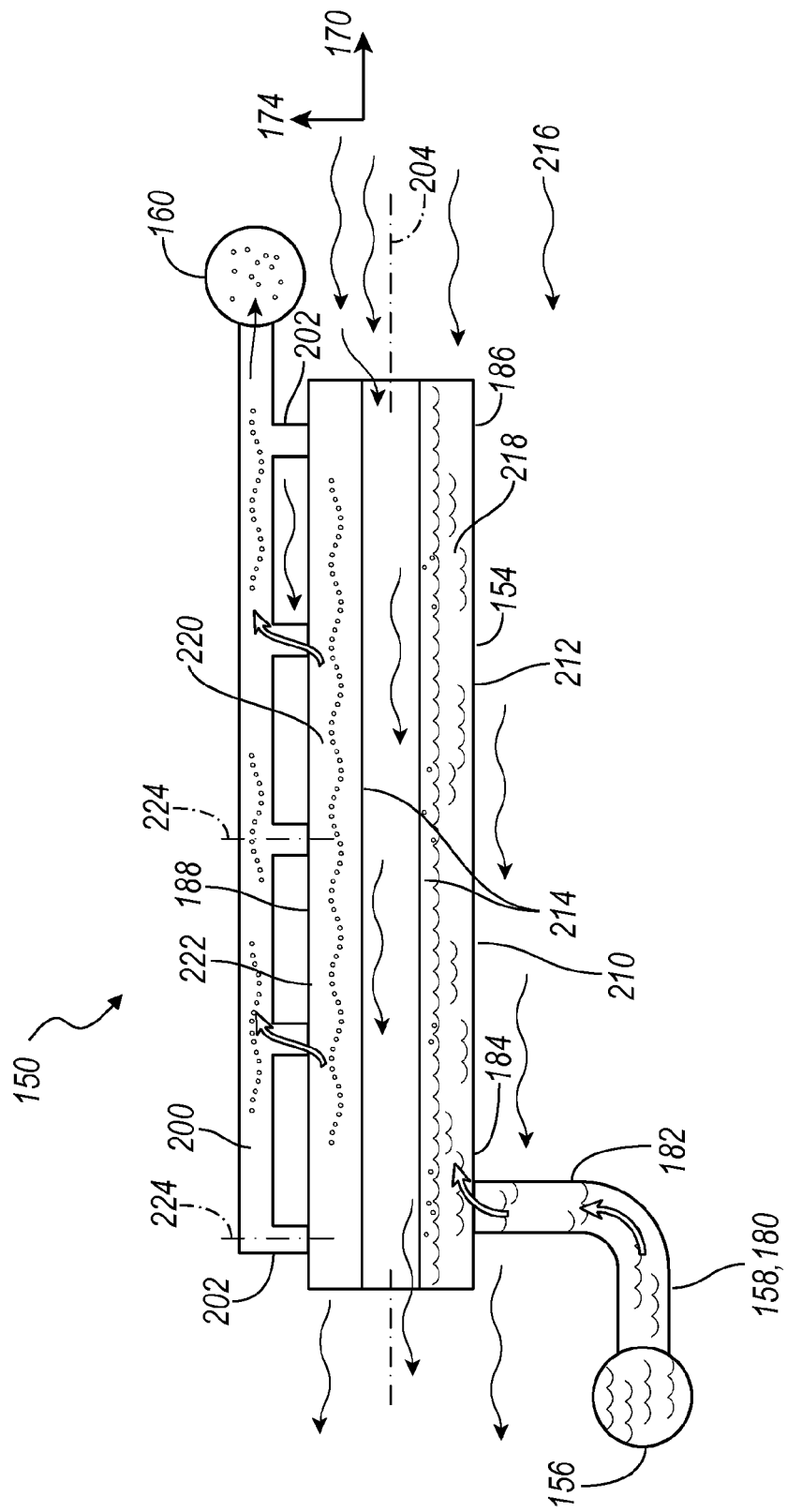
FIG. 4 illustrates a partial schematic cross-sectional view of the heat exchanger of FIG. 3.

FIG. 4 illustrates a partial cross-sectional schematic of the heat exchanger 150 to describe the operation of the heat exchanger 150, for example, as heat exchanger 76 in cycle 70. The heat exchanger 150 may be provided as an evaporator for the working fluid in the cycle 70.

The working fluid enters the heat exchanger 150 at the inlet manifold tube 156. The working fluid in tube 156 may be a sub-cooled liquid, a saturated liquid, or a liquid vapor mixed phase fluid. In one example, the working fluid in tube 156 is at point 132 on the diagram in FIG. 2 as a sub-cooled liquid. In another example, the working fluid may be at another state in region 122, region 124, or along the left hand side of the dome 120. In a further example, the heat exchanger 150 may be used as a superheater where the working fluid is in a vapor phase within the inlet manifold 156. For the purposes of this disclosure, the operation of the heat exchanger 150 is described as being an evaporator with the working fluid in the inlet manifold 156 as a sub-cooled liquid, as shown as point 132 in FIG. 2. The working fluid is heated within the heat exchanger such that the working fluid is a vapor phase or superheated vapor at the outlet manifold 160 tube, as shown as point 134 in FIG. 2. Therefore, the heat exchanger 150 is described as providing the 132 to 134 process portion of the cycle 70. In other examples with additional heat exchangers in a cycle, the heat exchanger 150 provides only a portion of the heating between points 132 and 134.

The liquid phase working fluid flows from the inlet manifold 156 to the inlet headers 158. The inlet header 180 has a vertical section 182. The vertical section 182 is illustrated in FIG. 4 as being connected to a lower surface 210 of the heat exchanger tube 154 and is connected to the outer wall 212 of the heat exchanger tube 154. As can be seen in FIG. 4, the inlet header 158 is connected at an end region 184 of the heat exchanger tube 154. The tube 154 has a shell construction.

The inlet header 158 is connected to the lower surface 210 to provide a bottom filling function for the heat exchanger tube 154. The inlet header 158 may act as a sump at a low point in the heat exchanger tube 154 to supply liquid working fluid for evaporation. The inlet header 158 is positioned at the lower surface 210 based on the forces on the liquid due to gravity and its higher density than the vapor phase. At least a portion of the gravitational forces are along the vertical axis 174. The liquid phase working fluid may fill a portion of the heat exchanger tube 154 as shown by a liquid level 218.

The heat exchanger tube has the outer wall 212. The heat exchanger tube 154 may also have a shell construction as described previously with an inner wall 214. The inner and outer walls 214, 212 contain the working fluid within a channel defined by the walls. The waste heat fluid 216, for example, an exhaust gas from an internal combustion engine, flows over the inner and outer walls 214, 212. The inner and outer walls 214, 212 may be circumferentially and concentrically arranged about the longitudinal axis 204 of the heat exchanger tube 154.

The heat exchanger 150 is illustrated as a counterflow heat exchanger. The waste heat fluid 216 is at a higher temperature than the working fluid. The waste heat fluid 216 transfers heat or energy to the working fluid within the heat exchanger tube 154. The heat transfer occurs based on both a convective heat transfer process and a conductive heat transfer process. Radioactive heat transfer may also occur. The heat transfer occurs from the waste heat fluid 216, across the heat exchanger tube 154, and to the working fluid.

As the working fluid is heated within the heat exchanger tube 154, the energy or enthalpy of the working fluid increases. As this is a generally constant pressure process, the heat transferred to the working fluid causes a phase change in the working fluid as the latent heat of vaporization for the working fluid is reached. The working fluid transitions from a liquid, to a liquid-vapor saturated mixture, and to a vapor phase at 220. The heat exchanger tube 154 may be positioned generally horizontally or aligned with axis 170 to provide increased efficiency of the evaporator 150 and the cycle 70. In one example, the heat exchanger 150 has approximately 90% efficiency with a waste heat fluid supplied to the heat exchanger 150 at approximately 700 degrees Celsius.

The heat exchanger tube 154 and risers 202 allow for direct and immediate phase separation of the working fluid as it evaporates, and a more even temperature distribution within the heat exchanger 150. The liquid phase 218 remains in the heat exchanger tube 154, and continues to receive heat from the waste heat fluid 216. As the tube is arranged horizontally, the liquid phase has a large contact area with the inner and outer walls for improved heat transfer. Additionally, the liquid phase of the working fluid has a greater free surface with the tube 154 for evaporation. Due to the geometry of the heat exchanger 150 and the multiple risers 202, the vapor phase has an immediate pathway to flow to the outlet manifold 160 after evaporating, thereby reducing or eliminating convoluted flow paths, vapor locks, or other regions causing a "hot spot" due to a portion of the vapor phase being trapped by surrounding liquid in a flow channel with continued heating. Generally, the thermal conductivity of a gas phase is significantly lower than that of a liquid phase for the working fluid. For example, liquid phase and gas phase R-134a has a thermal conductivity of 0.092 Watts per meter-Kelvin (W/mK) and 0.012 W/mK, respectively.

The vapor phase 220 of the working fluid rises in the heat exchanger tube 154, and exits the heat exchanger tube 154 through the risers 202. The risers 202 are spaced apart along the length of the heat exchanger tube 154 to provide multiple exit ports for the vapor phase. The risers 202 also are positioned for generally vertical flow of the vapor phase working fluid 220. The risers 202 are connected to an upper surface 222 of the heat exchanger tube 154. The upper surface is generally opposed to the lower surface 210. A riser 202 may be positioned adjacent to each end region 184, 186 of the tube 154, and additional risers 202 may be provided in an intermediate region 188 of the tube 154. Each riser 202 is shown as extending along a corresponding axis 224 generally perpendicular to the longitudinal axis 204, and in some examples, intersecting the axis 204.

The vapor phase working fluid 220 flows from the risers 202 into the collection tube 200 and to the outlet manifold tube 160. As shown in FIG. 4, the collection tube 200 may be generally parallel to the heat exchanger tube 154, and spaced apart from the tube 154. The outlet manifold tube 160 is upstream of an expander 84 in the cycle 70.

As can be seen in FIG. 4, the heat exchanger tube 154 is positioned between the inlet header 158 and outlet headers 202, and is positioned between the inlet manifold 156 and outlet manifold 160.

The controller 96 as shown in FIG. 1 may be used to control the cycle 70 and the closed loop such that the working fluid is a liquid phase at an inlet to the pump 72 and a vapor phase at an inlet to the expander 84. The controller 96 may be configured to control the closed loop or cycle such that the working fluid comprises a vapor phase in the plurality of risers 202 and the working fluid comprises a liquid phase in the inlet header 180.

For example, a conventional evaporator provides for a flow of working fluid through enclosed channels where the working fluid absorbs heat from the heat flow and is evaporated into gas. The vapor phase working fluid has a reduced thermal transfer efficiency due to the low thermal conductivity of the vapor compared to a liquid phase. Conventional evaporators include a flow path or heat exchanger chamber for the working fluid that travels up and down within the steamer, for example, following a sine curve for a round steamer. As the density of vapor is lower than that of the liquid, the liquid stays at the bottom of the channel and the vapor moves to the top, creating a "hot spot", which may lead to thermal fatigue of the evaporator and potential for leak issues.

Various examples of the present disclosure have associated, non-limiting advantages. For example, a heat exchanger for a Rankine or other thermodynamic cycle in a vehicle is provided. The heat exchanger has heat exchanger tubes or chambers for evaporation of a working fluid in the cycle using a waste heat fluid, such as an exhaust gas flowing around the heat exchanger tubes. As the working fluid is evaporated in the heat exchanger tubes, the vapor phase of the working fluid separates from the liquid phase and rises in vertical outlet risers of the outlet header. The liquid phase of the working fluid remains in the heat exchanger tubes and continues to be heated by the waste heat fluid. The remaining liquid in the heat exchanger tubes has a high thermal conductivity and high thermal transfer efficiency compared to the vapor phase. The design of the heat exchanger results in the liquid chambers and gas pipes having a generally even temperature distribution since phases of the working fluid separate as they evaporate.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
an expander, a condenser, a pump, and an evaporator in sequential fluid communication in a closed loop containing a working fluid;
wherein the evaporator comprises a housing receiving engine exhaust gas and surrounding a horizontal tube to transfer heat to the working fluid, the tube fluidly connecting an inlet header connected to a lower surface of the horizontal tube and a plurality of risers connected to and spaced apart along an upper surface of the horizontal tube.

2. The vehicle of claim 1 further comprising a controller configured to control the closed loop such that the working fluid is a liquid phase at an inlet to the pump and a vapor phase at an inlet to the expander.

3. The vehicle of claim 1 further comprising a controller configured to control the closed loop such that the working fluid comprises a vapor phase in the plurality of risers and the working fluid comprises a liquid phase in the inlet header.

4. The vehicle of claim 1 wherein the housing supports at least one baffle positioned to direct flow of the exhaust gas around the horizontal tube.

5. The vehicle of claim 1 wherein the horizontal tube has a first end region opposed to a second end region,
wherein the inlet header is connected to the lower surface of the horizontal tube in the first end region;

wherein a first riser of the plurality of risers is connected to the upper surface of the horizontal tube in the first end region;

wherein a second riser of the plurality of risers is connected to the upper surface of the horizontal tube in the second end region;

wherein a third riser of the plurality of risers is connected to the upper surface of the horizontal tube in an intermediate region between the first and second end regions; and wherein each one of the plurality of risers are connected to a collection tube in fluid communication with an outlet manifold of the evaporator.

6. The vehicle of claim 5 wherein the horizontal tube has a longitudinal axis;

wherein the collection tube is positioned above the horizontal tube and parallel to the longitudinal axis;

wherein the plurality of risers are spaced apart along the longitudinal axis of the horizontal tube; and wherein each riser of the plurality of risers extends along a corresponding axis intersecting and perpendicular to the longitudinal axis.

7. The vehicle of claim 5 wherein the horizontal tube defines a first distal end and a second distal end, the first end region adjacent to the first distal end and the second end region adjacent to the second distal end; and wherein the inlet header is connected to the lower surface of the horizontal tube in the first end region and is spaced apart from the first distal end.

8. The vehicle of claim 1 wherein the closed loop provides a thermodynamic Rankine cycle for energy recovery from vehicle waste heat; and wherein the evaporator is a once-through evaporator for the working fluid.

9. The vehicle of claim 1 further comprising an electric generator connected to a traction battery and an electric machine configured to propel the vehicle, the electric generator rotationally coupled to the expander, wherein the working fluid rotates the expander thereby rotating the electric generator and providing power to the traction battery.

10. The vehicle of claim 1 wherein the inlet header is positioned for vertical flow of the working fluid therethrough and into the horizontal tube; and wherein each riser of the plurality of risers is positioned for vertical flow of the working fluid therethrough.

11. The vehicle of claim 1 wherein the horizontal tube is one of a plurality of horizontal tubes arranged parallel to one another in the housing of the evaporator, each horizontal tube of the plurality of horizontal tubes having a corresponding inlet header and plurality of risers;

wherein the inlet headers of each of the plurality of horizontal tubes are connected to an inlet manifold; and wherein each one of the plurality of risers of each of the plurality of horizontal tubes are connected to an outlet manifold.

12. The vehicle of claim 1 wherein the evaporator further comprises an inlet manifold connected to the inlet header;

wherein the horizontal tube has a first end region and a second end region, the horizontal tube defining a flow channel for the working fluid, the tube directly contacting engine exhaust gases; and wherein the inlet header has an inlet riser section providing a vertical flow component for the working fluid containing a liquid phase, the inlet riser section connected to the lower surface of the horizontal tube adjacent to the first end region and in fluid communication with the flow channel to provide the working fluid containing the liquid phase to the horizontal tube.

13. The vehicle of claim 12 wherein the evaporator further comprises a collection tube connecting each of the plurality of risers to an outlet manifold; and wherein each of the plurality of risers provide a vertical flow component for a vapor phase of the working fluid, each of the plurality of risers connected to the upper surface of the horizontal tube, each of the plurality of risers in fluid communication with the flow channel to provide the vapor phase of the working fluid to the collection tube and the outlet manifold.

14. The vehicle of claim 13 wherein the inlet header is adjacent to the first end region and the outlet header manifold is adjacent to the second end region; and wherein the collection tube is parallel to and spaced apart from the horizontal tube.

15. The vehicle of claim 1 wherein the inlet header is perpendicularly connected to the lower surface of the horizontal tube.

16. A vehicle comprising:

an engine; and an expander, a condenser, and a pump in sequential fluid communication in a closed loop containing an evaporator configured to transfer heat between exhaust gas from the engine and a working fluid;

wherein the evaporator comprises a generally horizontal heat exchanger tube with a lower surface connected to an inlet header and a plurality of risers connected to and spaced apart along an upper surface of the tube;

wherein the evaporator further comprises a housing generally surrounding the heat exchanger tube and configured to receive exhaust gas, the housing supporting at least one baffle positioned to direct flow of the exhaust gas around the heat exchanger tube; and wherein the heat exchanger tube is a shell having an inner wall and an outer wall circumferentially and concentrically arranged, wherein the inner wall and outer wall define a channel therebetween, the channel in fluid communication with the inlet header and the plurality of risers for flow of the working fluid, and wherein the inner wall and outer wall are configured to contact exhaust gas.

* * * * *